(12) United States Patent
Gächter Toya et al.

(10) Patent No.: US 11,175,137 B2
(45) Date of Patent: Nov. 16, 2021

(54) MEASURING SYSTEM FOR VALIDATING A PRECONFIGURED TARGET ATTRIBUTE

(71) Applicant: LEICA GEOSYSTEMS AG, Heerbrugg (CH)

(72) Inventors: Stefan Martin Benjamin Gächter Toya, St. Gallen (CH); Norbert Kotzur, Altstätten (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 0 days.

(21) Appl. No.: 16/704,272

(22) Filed: Dec. 5, 2019

(65) Prior Publication Data

US 2020/0217662 A1 Jul. 9, 2020

(30) Foreign Application Priority Data

Jan. 3, 2019 (EP) .................... 19150268

(51) Int. Cl.
*H04N 7/18* (2006.01)
*G01C 15/02* (2006.01)
(Continued)

(52) U.S. Cl.
CPC ............... *G01C 15/02* (2013.01); *G01C 1/04* (2013.01); *G06K 9/6267* (2013.01); *G06T 7/73* (2017.01)

(58) Field of Classification Search
CPC ........ G01C 15/02; G01C 1/04; G01C 15/002; G01C 15/00; G06T 7/73; G06K 9/6267; G06N 3/08
(Continued)

(56) References Cited

U.S. PATENT DOCUMENTS 7,583,373 B2 9/2009 Schwarz
2004/0093166 A1* 5/2004 Kil ..................... G06K 9/00127
702/19
(Continued)

FOREIGN PATENT DOCUMENTS

EP  1 686 350 A1  8/2006
EP  2 141 450 A1  1/2010

OTHER PUBLICATIONS

Patias P et al., Robust pose estimation through visual/gnss mixing (Year: 2016).*

(Continued)

*Primary Examiner* — Shan E Elahi
(74) *Attorney, Agent, or Firm* — Maschoff Brennan

(57) ABSTRACT

A measuring system comprising a measuring instrument and a computer system, the measuring instrument comprising a base unit, a support unit mounted on the base unit, a targeting unit comprising a distance meter having a targeting axis, a first angle encoder configured for measuring a horizontal angular position of the support unit, a second angle encoder for measuring a vertical angular position of the targeting unit, a camera for capturing image data, and a control unit is configured for computing a position of a target based on a preconfigured target attribute, the computer system being configured for receiving the image data from the camera, executing a classifier for determining at least one of a plurality of classes of at least part of the image data, validating a preconfigured target attribute based on the at least one class target attribute, and generating result data based on the validation.

16 Claims, 2 Drawing Sheets

(51) Int. Cl.
*G06T 7/73* (2017.01)
*G01C 1/04* (2006.01)
*G06K 9/62* (2006.01)

(58) Field of Classification Search
USPC .......................................................... 348/135
See application file for complete search history.

(56) References Cited

U.S. PATENT DOCUMENTS

| | | | | |
|---|---|---|---|---|
| 2005/0025357 A1* | 2/2005 | Landwehr | ............. | A01M 1/026 |
| | | | | 382/170 |
| 2009/0244291 A1* | 10/2009 | Saptharishi | ........ | H04N 5/23293 |
| | | | | 348/187 |
| 2011/0002507 A1* | 1/2011 | Kuoch | ............... | B60R 21/0134 |
| | | | | 382/103 |
| 2013/0293705 A1* | 11/2013 | Schorr | .................. | G01B 11/24 |
| | | | | 348/135 |
| 2014/0098381 A1* | 4/2014 | Bridges | .................. | G01S 17/66 |
| | | | | 356/614 |
| 2014/0105457 A1* | 4/2014 | Metzler | .................... | G01C 1/04 |
| | | | | 382/103 |
| 2016/0035096 A1* | 2/2016 | Rudow | ................... | H04M 3/00 |
| | | | | 348/135 |
| 2016/0146604 A1* | 5/2016 | Metzler | ................. | G01C 21/20 |
| | | | | 33/228 |
| 2017/0337743 A1* | 11/2017 | Metzler | .................. | G01C 15/02 |
| 2019/0094021 A1* | 3/2019 | Singer | ..................... | G01S 17/89 |
| 2020/0166340 A1* | 5/2020 | Hinderling | ........... | F16M 11/125 |
| 2020/0355499 A1* | 11/2020 | Hinderling | ................ | G06T 7/66 |

OTHER PUBLICATIONS

Extended European Search Report dated Jul. 5, 2019 as received in Application No. 19150268.1.

* cited by examiner

MEASURING SYSTEM FOR VALIDATING A PRECONFIGURED TARGET ATTRIBUTE

CROSS-REFERENCE TO RELATED APPLICATIONS

This application claims priority to European Patent Application No. 19150268.1, filed on Jan. 3, 2019. The foregoing patent application is herein incorporated by reference.

FIELD OF THE INVENTION

The present invention relates to a measuring system adapted for surveying and stake-out purposes, and comprising a measuring instrument and a computer system. The invention further relates to a method of validating a preconfigured target attribute with a measuring system. Accordingly, the invention pertains to the fields of geodesy and metrology.

BACKGROUND OF THE INVENTION

In common measuring or stake-out procedures, a surveyor aims a measuring instrument, in particular a total station, a tachymeter, or a theodolite, at one of many different types of targets and then precisely measures a distance to the target (e.g. prisms, reflectors, tapes, target plates) or a position of the target.

Likewise, such targets can be tracked by laser trackers or total stations, wherein the type of target is usually taken into account, too. During a tracking process, a position of the target is frequently determined by the measuring instrument.

Each type of target usually has at least one attribute, which can be considered when measuring, staking out, or tracking. For example, an individual distance offset (target additive constant) could be inherent to each target and because such offset is mostly significant in terms of measurement accuracy, it should to be correctly considered when measuring the distance to the target or the position of the target. Other attributes may relate to settings of the measuring instrument (e.g. operative parameters).

Usually, such attributes are manually settable on measuring instruments, for which the surveyor has to decide on which type of target is present and/or which attribute(s) is/are assigned to that target. For example, due to the distance between the surveyor and the target, which is usually rather high, such decision and the setting resulting therefrom are error prone and may cause significant errors in case a target is not correctly identified by the user.

OBJECT OF THE INVENTION

Therefore, some aspects of the invention provide an improved measuring system that supports the surveyor by validating a preconfigured attribute. A measuring system according to the invention allows for more ergonomic, more productive, and more robust measurements in terms of accuracy and reliability.

SUMMARY OF THE INVENTION

Some aspects of the present invention relate to a measuring system comprising a measuring instrument and a computer system, the measuring instrument comprising a base unit configured for positioning the measuring instrument, a support unit mounted on the base unit and configured for being horizontally rotatable relative to the base unit, a targeting unit comprising a distance meter, the targeting unit being mounted on the support unit and configured for being vertically rotatable relative to the support unit, the distance meter having a targeting axis, a first angle encoder configured for measuring a horizontal angular position of the support unit, a second angle encoder configured for measuring a vertical angular position of the targeting unit, a camera with a field of view that is crossed by the targeting axis, wherein the camera is configured for capturing image data, a control unit configured for computing a position of a target based on a preconfigured target attribute, the computer system being configured for receiving the image data from the camera, executing a classifier, the classifier being configured for determining at least one of a plurality of classes based on classifying at least part of the image data, wherein each of the plurality of classes is associated with a class target attribute, validating the preconfigured target attribute based on the at least one class target attribute which the determined at least one of the plurality of classes is associated with, generating result data based on the validation, and providing the result data.

The preconfigured target attribute and each class target attribute may be indicative for at least one of: whether or not the image data contain representation of a target, which type of target is represented with the image data, a measuring parameter for measuring a distance to or a position of a target represented with the image data, and a tracking parameter for tracking a target represented with the image data.

The classifier may be configured for generating a probability value for each determined class, the probability value being indicative for a probability that the classifier determined the respective class correctly, wherein generating the result data is further based on the at least one probability value.

The computer system may be configured for automatically selecting a measuring parameter or tracking parameter based on the at least one probability value.

The measuring parameter or the tracking parameter may comprise a target additive constant belonging to a target represented with the image data, and the computer system may be configured for automatically adding the target additive constant to a raw distance measurement value measured with the distance meter in order to provide a corrected distance measurement value.

The classifying may comprise mapping the at least part of the image data onto the respective class based on intensity values of the image data, or extracting features from the at least part of the image data and mapping the extracted features onto the respective class.

At least part of the computer system may be comprised by a remote computer, wherein the measuring instrument is configured for connecting to the remote computer, a controller device, wherein the measuring instrument is configured for connecting to the controller device, or the measuring instrument.

The measuring system may comprise a user interface unit, the user interface unit being configured for receiving the result data from the computer system, and outputting a signal in response to the result data.

The signal may represent a choice of at least one class target attribute which the determined at least one of a plurality of classes is associated with.

The user interface unit may be configured for receiving a user input, the user input being based on a selection of one of the choice of at least one class target attribute, or an overruling target attribute differing from any of the choice of at least one class target attribute.

The computer system may be configured for re-training the classifier with a machine learning algorithm which is based on at least one of the image data, the selection, and the overruling target attribute.

Some aspects of the invention further relate to a method of validating a preconfigured target attribute with a measuring system according to any of the preceding claims, comprising providing the control unit with the preconfigured target attribute, capturing image data with the camera, receiving the image data with the computer system, executing the classifier with the computer system, determining at least one of a plurality of classes with the classifier based on classifying at least part of the image data, wherein each of the plurality of classes is associated with a class target attribute, validating the preconfigured target attribute with the computer system based on the at least one class target attribute which the determined at least one of a plurality of classes is associated with, generating result data with the computer system based on the validation, and providing the result data with the computer system.

The method may further comprise generating a probability value for each determined class with the classifier, the probability value being indicative for a probability that the classifier determined the respective class correctly, wherein generating the result data is further based on the at least one probability value.

Given that the preconfigured target attribute and each class target attribute are indicative for at least one of: a measuring parameter for measuring a distance to or a position of a target represented with the image data, and a tracking parameter for tracking a target represented with the image data, the method may further comprise automatically selecting a measuring parameter or tracking parameter with the computer system based on the at least one probability value.

Given that the preconfigured target attribute and each class target attribute are indicative for a measuring parameter, the measuring parameter comprises a target additive constant belonging to the target represented with the image data, the method may further comprise automatically adding, with the computer system, the target additive constant to a raw distance measurement value measured with the distance meter in order to provide a corrected distance measurement value.

BRIEF DESCRIPTION OF THE DRAWINGS

By way of example only, preferred embodiments of the invention will be described more fully hereinafter with reference to the accompanying figures, wherein.

DETAILED DESCRIPTION OF THE DRAWINGS

Figure 1:
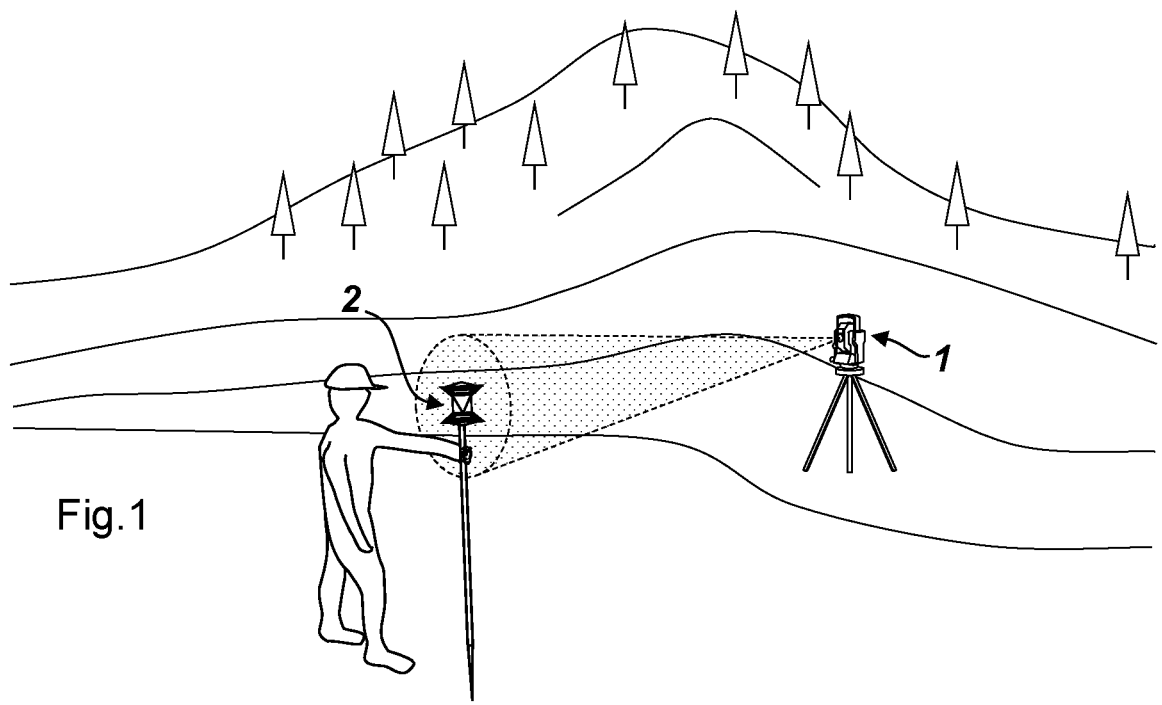
FIG. 1 shows usage of a first embodiment of a surveying system, wherein a surveyor performs a stake-out, and a retro-reflector is detected with an on-axis RGB-camera of a total station, and a measuring parameter associated with said retro-reflector is taken into account when a distance to the retro-reflector is measured with the total station.

FIG. 1 shows a measuring situation with an exemplary measuring instrument embodied as total station 1 and a target embodied as a retro-reflector 2. The total station 1 has a camera which is by way of example built into a targeting unit such that an optical axis of the camera is essentially aligned with a targeting axis of a distance meter comprised by the targeting unit. The camera is thus configured for capturing image data of what the targeting unit is targeting. The image data can be one or more single image(s), a sequence or an excerpt from a video stream, or data based on an image (such as extractions after a certain pre-processing of an image). The targeting unit can be pivoted vertically and, by means of a support unit in which the targeting unit is mounted, also horizontally. The vertical and horizontal angles are each determined by respective angle encoders. Thus, by determining a vertical angular position, a horizontal angular position, and a measured distance, the measuring instrument acts as a coordinate measuring device.

Figure 2:
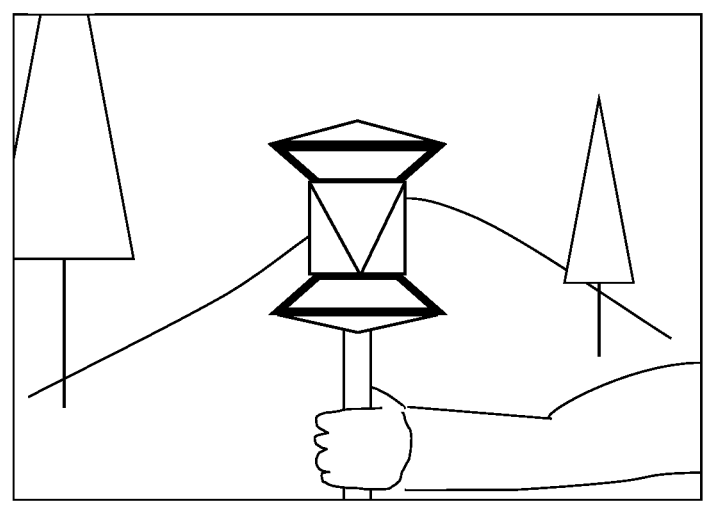
FIG. 2 shows an image captured by the on-axis camera of the total station in the situation as shown in FIG. 1.

In the shown case, the targeting axis is already aimed at the retro-reflector 2 and therefore, the camera is capturing an image according to FIG. 2 where the target 2 is depicted. The camera could have a colour sensor providing coloured images. In other embodiments, the camera can have a greyscale sensor or any other similar sensor.

The distance meter also comprised by the total station can use the time-of-flight principle by emitting and receiving measuring beams (e.g. laser light). In case of a laser based distance meter, a beam axis (=targeting axis) of the distance meter is at least in part running through the field of view of the camera, such that the camera captures the point that the distance meter is currently aimed at. Therefore, the optical axis of the camera can also be non-coincident with regard to the targeting axis, as long as the targeting axis is at some point "entering" into the field of view of the camera. The distance meter could also be an absolute distance meter, and/or make use of interferometry, sonic waves, infrared light, or other techniques.

In case the measuring beam emitted by the distance meter, i.e. the targeting axis, is pointed at the retro-reflector 2, the position of the retro-reflector 2 relative to the total station 1 can be measured with the total station 1 in that the distance to the retroreflector 2 is determined with the distance meter and the horizontal and vertical angles of the alignment of the measuring beam are determined with the angle encoders. Said measured distance and the two angles could give a position in a spherical coordinate system. In the particular case of the target being a retro-reflector 2, the target reflects the measuring beam exactly back to where it came from (i.e. towards the distance meter).

The targeting unit could comprise a telescope that may be designed to allow a user to look through by means of an ocular, or it could be designed as a digital telescope having an on-axis camera for providing the current view with an Electronic Viewfinder (EVF) and/or on an external display, e.g. on a display of a tablet computer or smart phone. The optical axis of the on-axis camera is essentially coaxial with the optical axis of the telescope. Said on-axis camera can be the camera as herein mentioned or be a separate camera dedicated to the EVF.

A measuring system according to the invention can comprise a total station or a laser tracker as measuring instrument, and a computer system. Optionally, the measuring system also comprises a user interface unit. One option is that the computer system is comprised by the measuring instrument. The computer system or part of the computer system, however, may also be located externally to the measuring instrument. The same is true for the user interface unit which could be integrated into the measuring instrument or located in an external device. For example, the user interface unit could be comprised by a controller device, a smart phone, or a tablet PC each of which is connected to the measuring instrument over internet, wireless local area network (WLAN), Bluetooth, or radio link. The computer system can also be (at least partially) integrated in such devices, or the computer can be a remote computer (e.g. on a server which is connected to the total station over internet, WLAN, Bluetooth, or radio link).

The computer system can execute a classifier. Particularly, the computer system is connected to not only one measuring instrument, but to a plurality of measuring instruments, thereby being able to collect many field data. The classifier is an algorithm that can handle a large number of classes and is robust against changing environmental conditions, such as background structures/colours. Classification is a mapping of an input (at least part of an image or features extracted from at least part of an image) to an output (an attribute, such as a target additive constant or a tracking parameter), in particular with a certain confidence, i.e. a likelihood of correctness. The mapping could be learnt by examples. For each class, a certain amount of images (or a certain amount of features derived from images) can be provided, wherein for each class, the images show targets with the same attribute.

Such attribute may be indicative for whether a captured image depicts a target at all, or not. If an image is mapped to a class of which the attribute is "non-target" then it could result from the fact that the image to be classified contains no target and the classifier recognised this because it "learnt" from a plurality of random images not containing a target that the current image to be classified does not show a target. In contrast, the classified could map the image to a class having the attribute "target" wherein it has learnt from a plurality of images containing a target that the current image to be classified does indeed also show a target.

Of course, this principle can be extended to a higher level of detail where different classes are provided by which the type of target can be identified with the classifier. For example, the classifier can identify whether the target is a reflector or a prism or a target plate. More specifically, the classifier can identify the exact type of target, such that the image can lead to the conclusion of which target attribute is inherent to the target depicted. There are different types of reflector plates, different types of prisms, etc., in each case potentially with different configurations which result e.g. in different target additive constants, i.e. distance offset values to be added to a distance measurement.

Another target attribute could comprise one or more tracking parameters, wherein on the basis of a classified image, the measuring instrument (e.g. embodied as a laser tracker, or a total station capable of tracking) could be adapted in its settings such that a tracking of the target depicted in the image is more robust or more precise.

In many cases, the classifying is not an unambiguous procedure, which is why not only one class could be determined based on classifying at least part of the image, but more than one class could be determined (suggested). However, the classifier could be configured to specify a likelihood for each of the determined classes. Thus, in each case a probability value could be generated that is indicative for a probability that the classifier determined the respective class correctly. The result data provided by the computer system (which in the most basic embodiment of the invention only is based on a validation of a preconfigured target attribute) could accordingly further be based on such at least one probability value. In a very specific example, the computer system provides a choice of different target types, e.g. as a ranking with respect to the likelihood (1. Target type X 98%, 2. Target type Y 74%, 3. Target type Z 14%, etc.).

In particular, for making such result data available for the surveyor, the measuring system can be further equipped with a user interface unit that is configured for receiving the result data from the computer system, and outputting a signal in response to the result data. The result data are not necessarily highly detailed data, such as the above mentioned list or ranking, but could also be a mere affirmation and the signal, accordingly, can be a green light or acoustical signal for indicating to the surveyor that the preconfigured target attribute is in accordance with the target captured in a current image. Also, analogously, the result data can be a mere denial (image does not show a target with the preconfigured attribute) and the signal can be a red light/different sound.

The result data can also contain or be based on class target attribute(s). In particular, the result data can comprise a graphical representation of a target that has been identified by the classifier, in particular together with a name and/or technical details of the target, all displayable on the user interface unit. The result data may also comprise corresponding probability value(s) of the class(es).

In a further embodiment, the classifier is configured for classifying several different targets within a single image.

An image captured by the camera can be considered a matrix of intensity values, therefore the mapping (classifying) of the image to a class can be done directly, i.e. from intensity values to class labels (attributes). Alternatively, features can be extracted from the image first. Afterwards, the extracted features can be mapped to the class labels.

The mapping/classifying can be trained with a machine learning algorithm, e.g. based on a feedback from the surveyor. Such a feedback could be included by the optionally provided user interface unit of the measuring system. For this, the user interface unit would be further configured for receiving a user input, e.g. via a touchscreen, or a keyboard, or a voice recognition application. Said user input would be based on a selection of a target, i.e. the user would tap on an icon or text shown on the display or select an icon or text via a control element of the user interface unit in order to confirm that a respective target is used in the field. The choice of class target attributes can comprise one or more class target attributes. A class target attribute can be a name of the corresponding target, several names of corresponding targets (because more than one target could be associated with one class), graphical representation(s) of the corresponding targets, type(s) of the corresponding target(s), a measuring parameter such as a target additive constant, a tracking parameter such as settings for a laser tracker or a total station with tracking capabilities, an indication that no target is captured currently.

In further embodiments, the computer system may bring about at least one of a manual functionality or mode, and an automatic functionality or mode. In a manual mode, as was outlined above, the result data may be provided to a surveyor for giving him the chance to confirm a target or to select one of a choice of suggested targets based on a classification of the image. In an automatic mode, these decisions can be made automatically by the computer system. Preferably, the attribute (e.g. a measuring parameter or tracking parameter) with the highest probability value is selected. Specifically, in case the target attribute is a target additive constant, the target additive constant can be automatically added to a "raw" distance measurement value performed by the distance meter in order to arrive at a "corrected" distance measurement value. Likewise, of course, a target attribute being a position offset or a tracking parameter could be taken into account automatically.

Even when the preconfigured target attribute is confirmed or exchanged by the automatic mode, there may still be provided a manual overrule possibility, e.g. by offering the surveyor over the user interface unit alternative attributes. Also, the automatic mode could give the surveyor a time window for overruling, and if the time runs out without the surveyor intervening, the automatic selection may be applied.

In other words, the computer system is further configured for receiving a user selection of one of the class target attributes. However, the class target attributes can also be automatically selected by the computer system, e.g. by choosing the one which has the highest probability value. The user interface unit can display a ranking (list) of the class target attributes in the order of the probability values and offer them to the user to select one or to deny all of them in case the target has not been recognised. The targets can be listed by showing one or more target attributes, such as their names or a corresponding image of the target.

The computer can be configured for adding an offset to a distance measured with the distance meter (to the target currently targeted), wherein the target attribute can be or comprise said offset that is assigned to the determined class. Targets which have the same offset (e.g. because of their geometric similarity) could be in the same class. Targets can be prisms, target plates, reflective tapes or plates, or cat eyes, and the target additive constant (offset) could be a distance value but also be zero.

Optionally, a measuring instrument may also comprise a learning functionality when confronted with a target that is unknown so far, i.e. of which there is no suitable class available. This could show up from very low probability values. For example, the status "unknown" may be determined in case the similarity value undercuts a certain threshold. The measuring instrument can then by means of a user interface unit offer the user to store the image of said unknown target and add it to a new class. Additionally, the surveyor may manually input an offset belonging to the unknown target and/or input any other attributes such as the name or other parameters.

Figure 3:
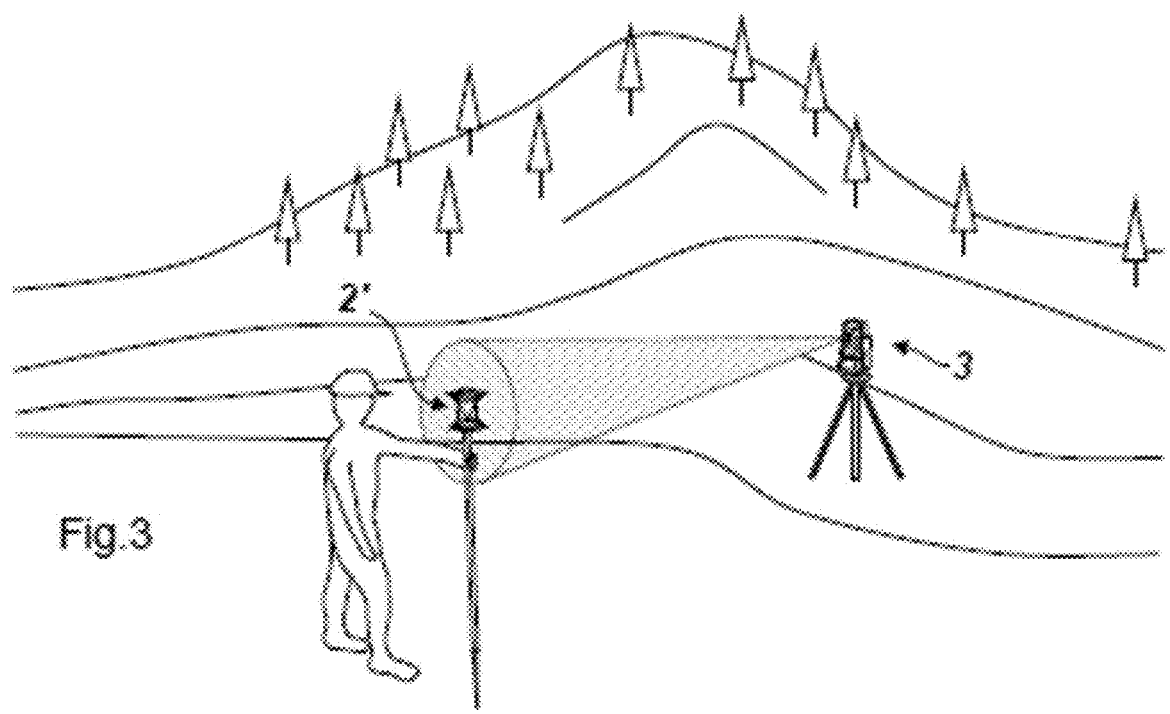
FIG. 3 shows usage of a second embodiment of a surveying system, wherein a surveyor performs a stake-out, and a retro-reflector is tracked with an Automatic Target Recognition (ATR) camera of a total station, and a tracking parameter associated with said retro-reflector is taken into account.

FIG. 3 shows a similar example as explained on the basis of FIG. 1. A total station 3, however, has an Automatic Target Recognition (ATR)-camera that is used as the camera. Alternatively, the camera could also be a PowerSearch (PS)-camera. The optical axis of the camera in FIG. 3 is at least roughly parallel to the targeting axis defined by the distance meter.

PowerSearch is a one-dimensional target search system integrated in the measuring instrument, developed by Leica Geosystems, and comprises a PS-camera, a target search light designed for emitting a fan beam, and a configuration for prompting the targeting unit of the measuring instrument to pivot horizontally or vertically. The PS-camera is designed to detect reflections of the fan beam; therefore, the sensor of the PS-camera may be line-shaped. With the angle encoders, one of the vertical and horizontal direction can be determined where a reflection was detected.

ATR (Automatic Target Recognition) has also been developed by Leica Geosystems and is a two-dimensional target search system. It is also integrated in the measuring instrument and comprises an ATR-camera and a target search light designed for emitting a flash light. Usually, the ATR-system also has a configuration for prompting the telescope of the measuring instrument to pivot horizontally and/or vertically in order to let the beam axis aim at where the target is detected ("tracking"). A detection is realised by the ATR-camera which has a sensor designed to detect the ATR-flashlight. Depending on the location of the reflection of the ATR-light within the sensor, the targeting unit is pivoted to point the distance meter beam onto the target. This procedure can be repeated continuously in order to provide the tracking of a moving target.

Figure 4:
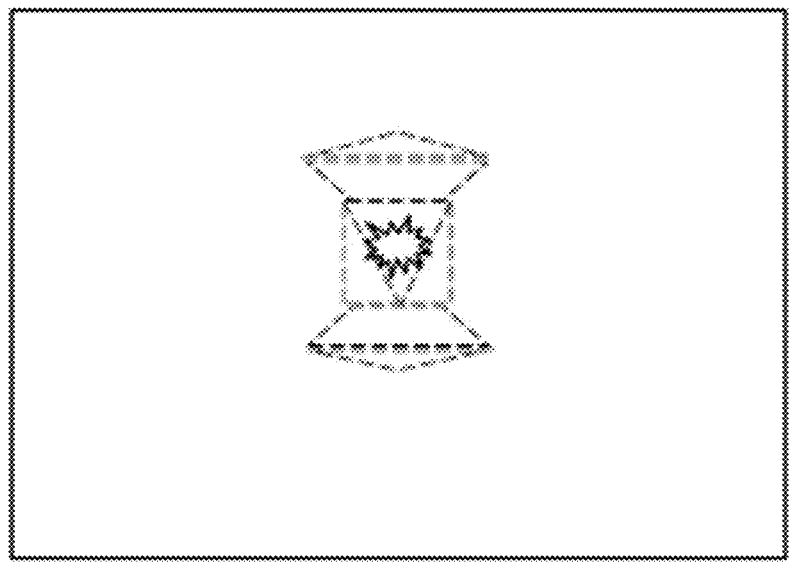
FIG. 4 shows an image captured by the ATR camera of the total station in the situation as shown in FIG. 3.

In the example shown in FIG. 3, the camera is the ATR-camera of the ATR-system. The surveying instrument 3 is tracking the reflector with help of the ATR-system. Because the sensor of the ATR camera is only or mostly sensitive to the light of the target search light (with regard to the wavelength), the resulting image captured by the ATR-camera is as shown in FIG. 4. The dashed outline of the retro-reflector is not actually depicted, but is shown here to clarify where the reflecting ATR-flash comes from. The classification now is based on this shape of the reflected ATR-light. The class belonging can thus be determined, not because of the different physical appearance of the target itself, but because of the different way of the target to reflect light. For example, the features of the detected flash shape distinguish the different targets from one another as well as from other reflective surfaces in the environment.

Different targets may further or alternatively cause different intensities and/or different colours of reflections. The computer system connected to the total station 3 is configured for running a classifier to determine a class corresponding to the target to which the reflections has been detected. From the target attribute associated with the determined class, the preconfigured target attribute is validated and result data are generated and provided.

False reflections may have an own class such that the classifier can identify them. False reflections are similarly handled like "non-targets" as they have been described herein because false reflections are caused by highly reflective surfaces (not targets) of reflections of the ATR-flash.

Although the invention is illustrated above, partly with reference to some preferred embodiments, it must be understood that numerous modifications and combinations of different features of the embodiments can be made. All of these modifications lie within the scope of the appended claims.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The invention claimed is:

1. A geodetic measuring system comprising:
   a geodetic measuring instrument including:
   a base unit configured for positioning the measuring instrument,
   a support unit mounted on the base unit and configured for being horizontally rotatable relative to the base unit, a targeting unit comprising a distance meter, the targeting unit being mounted on the support unit and configured for being vertically rotatable relative to the support unit, the distance meter having a targeting axis, a first angle encoder configured for measuring a horizontal angular position of the support unit, a second angle encoder configured for measuring a vertical angular position of the targeting unit, a camera with a field of view that is crossed by the targeting axis, wherein the camera is configured for capturing image data, a control unit configured for computing a position of a target based on a preconfigured target attribute, wherein the position of the target includes:

a) a distance value determined with the distance meter, (b) a horizontal angular position of the support unit determined with the first angle encoder, and (c) a vertical angular position of the targeting unit determined with the second angle encoder; and a computer system being configured for:

receiving the image data from the camera, executing a classifier, the classifier being configured for determining at least one of a plurality of classes based on classifying at least part of the image data, wherein each of the plurality of classes is associated with a class target attribute, validating the preconfigured target attribute based on the at least one class target attribute which the determined at least one of the plurality of classes is associated with, generating result data based on the validation, and providing the result data, wherein the preconfigured target attribute and each class target attribute being indicative for at least one of:

a measuring parameter for measuring a distance to or a position of a target represented with the image data, and a tracking parameter for tracking a target represented with the image data.

2. The geodetic measuring system according to claim 1, wherein the classifier is configured for generating a probability value for each determined class, the probability value being indicative for a probability that the classifier determined the respective class correctly, wherein generating the result data is further based on the at least one probability value.

3. The geodetic measuring system according to claim 2, wherein the computer system being configured for automatically selecting a measuring parameter for measuring a distance to or a position of a target represented with the image data or tracking parameter for tracking a target represented with the image data based on the at least one probability value.

4. The geodetic measuring system according to claim 3, wherein the measuring parameter or the tracking parameter comprising a target additive constant belonging to a target represented with the image data, and the computer system being configured for automatically adding the target additive constant to a raw distance measurement value measured with the distance meter in order to provide a corrected distance measurement value.

5. The geodetic measuring system according to claim 1, wherein the classifying comprises:

mapping the at least part of the image data onto the respective class based on intensity values of the image data, or extracting features from the at least part of the image data and mapping the extracted features onto the respective class.

6. The geodetic measuring system according to claim 1, wherein at least part of the computer system is comprised by:

a remote computer, wherein the measuring instrument is configured for connecting to the remote computer, a controller device, wherein the measuring instrument is configured for connecting to the controller device, or the measuring instrument.

7. The geodetic measuring system according to claim 1, further comprising a user interface unit, the user interface unit being configured for:

receiving the result data from the computer system, and outputting a signal in response to the result data.

8. The geodetic measuring system according to claim 7, wherein the signal represents a choice of at least one class target attribute which the determined at least one of a plurality of classes is associated with.

9. The geodetic measuring system according to claim 8, the user interface unit being configured for receiving a user input, the user input being based on:

a selection of one of the choice of at least one class target attribute, or an overruling target attribute differing from any of the choice of at least one class target attribute.

10. The geodetic measuring system according to claim 9, wherein the computer system is configured for re-training the classifier with a machine learning algorithm which is based on at least one of the image data, the selection, and the overruling target attribute.

11. The geodetic system according to claim 1, wherein the control unit is configured such that the position is corrected by the preconfigured target attribute.

12. A method of validating a preconfigured target attribute with a measuring system comprising:

a measuring instrument including:

a base unit configured for positioning the measuring instrument, a support unit mounted on the base unit and configured for being horizontally rotatable relative to the base unit, a targeting unit comprising a distance meter, the targeting unit being mounted on the support unit and configured for being vertically rotatable relative to the support unit, the distance meter having a targeting axis, a first angle encoder configured for measuring a horizontal angular position of the support unit, a second angle encoder configured for measuring a vertical angular position of the targeting unit, a camera with a field of view that is crossed by the targeting axis, wherein the camera is configured for capturing image data, a control unit configured for computing a position of a target based on a preconfigured target attribute; and a computer system being configured for:

receiving the image data from the camera, executing a classifier, the classifier being configured for determining at least one of a plurality of classes based on classifying at least part of the image data, wherein each of the plurality of classes is associated with a class target attribute, validating the preconfigured target attribute based on the at least one class target attribute which the determined at least one of the plurality of classes is associated with, generating result data based on the validation, and providing the result data; and the method comprising:

providing the control unit with the preconfigured target attribute, capturing image data with the camera, receiving the image data with the computer system, executing the classifier with the computer system, determining at least one of a plurality of classes with the classifier based on classifying at least part of the image data, wherein each of the plurality of classes is associated with a class target attribute, validating the preconfigured target attribute with the computer system based on the at least one class target attribute which the determined at least one of a plurality of classes is associated with, generating result data with the computer system based on the validation, and providing the result data with the computer system, the preconfigured target attribute and each class target attribute being indicative for at least one of:

a measuring parameter for measuring a distance to or a position of a target represented with the image data, and a tracking parameter for tracking a target represented with the image data.

13. The method according to claim 12, further comprising:

generating a probability value for each determined class with the classifier, the probability value being indicative for a probability that the classifier determined the respective class correctly, wherein generating the result data is further based on the at least one probability value.

14. The method according to claim 12, the method further comprising:

automatically selecting a measuring parameter for measuring a distance to or a position of a target represented with the image data or tracking parameter for tracking a target represented with the image data with the computer system based on the at least one probability value.

15. The method according to claim 12, wherein the preconfigured target attribute and each class target attribute being indicative for a measuring parameter, the measuring parameter comprising a target additive constant belonging to the target represented with the image data, and the method further comprises:

automatically adding, with the computer system, the target additive constant to a raw distance measurement value measured with the distance meter in order to provide a corrected distance measurement value.

16. The method according to claim 10, further comprising correcting the position by the preconfigured target attribute.

* * * * *